United States Patent [19]

Asmus et al.

[11] Patent Number: 4,752,307
[45] Date of Patent: Jun. 21, 1988

[54] CONTACTING GAS AND LIQUID

[75] Inventors: Gerardus Asmus, Amstelveen; Martin M. Suenson, The Hague; Anton M. Danckaarts, Amsterdam, all of Netherlands

[73] Assignee: Shell Oil Company, Houston, Tex.

[21] Appl. No.: 917,889

[22] Filed: Oct. 14, 1986

[30] Foreign Application Priority Data

Jan. 21, 1986 [GB] United Kingdom ............... 8601359

[51] Int. Cl.⁴ .............................................. B01F 3/04
[52] U.S. Cl. ......................................... 55/73; 55/90; 55/93; 261/79.2; 261/96; 261/97
[58] Field of Search ............... 261/79.2, 96, 97; 55/90, 93, 73

[56] References Cited

U.S. PATENT DOCUMENTS

| 3,022,859 | 2/1962 | Sexton | 55/90 |
|---|---|---|---|
| 3,210,914 | 10/1965 | Eckert | 55/90 |
| 3,334,470 | 8/1967 | Huppke | 55/90 |
| 3,345,046 | 10/1967 | Versluys et al. | 261/79.2 |
| 3,348,364 | 10/1967 | Henby | 261/79.2 |
| 3,498,028 | 3/1970 | Trouw | 261/79.2 |
| 3,605,388 | 9/1972 | Zuiderweg et al. | 261/79.2 |
| 4,022,593 | 5/1977 | Lemer | 55/90 |

FOREIGN PATENT DOCUMENTS

| 785264 | 5/1968 | Canada . | |
| 1260437 | 2/1968 | Fed. Rep. of Germany . | |
| 133405 | 1/1979 | German Democratic Rep. . | |
| 1172680 | 12/1969 | United Kingdom . | |
| 1193203 | 5/1970 | United Kingdom . | |
| 570365 | 2/1977 | U.S.S.R. . | |
| 575105 | 10/1977 | U.S.S.R. | 261/79.2 |
| 997709A | 2/1983 | U.S.S.R. . | |

Primary Examiner—Tim Miles

[57] ABSTRACT

An apparatus for contacting gas and liquid is disclosed in which a vessel has fluid inlet means, fluid outlet means and horizontal trays arranged axially spaced apart in the vessel. Each horizontal tray is provided with a plurality of contacting means which have an open-ended vertical tube, contacting material and swirl imparting means arranged therein, and means allowing liquid collected on a horizontal tray to pass into the vertical tube below the contacting material and from the upper end of the vertical tube to below the tray.

15 Claims, 2 Drawing Sheets

CONTACTING GAS AND LIQUID

BACKGROUND OF THE INVENTION

The present invention relates to an apparatus for contacting gas and liquid comprising a vessel having fluid inlet means and fluid outlet means.

Known in the art is a vessel filled with contacting material, wherein, during normal operation, gas and liquid are passed co-currently through the vessel to obtain intensive contacting between gas and liquid.

SUMMARY OF THE INVENTION

It is an object of the present invention to provide an apparatus for contacting gas and liquid allowing countercurrent flow of gas and liquid through the vessel.

To this end, the apparatus for contacting gas and liquid according to the invention comprises a vessel having a horizontal tray, fluid inlet means and fluid outlet means. The horizontal tray is provided with a contacting means having an open-ended vertical tube in which contacting material is arranged and in which swirl imparting means are arranged above the contacting material. The contacting means further includes first conduit means which allows fluid communication between the space above the horizontal tray and the interior of the vertical tube below the contacting material, and second conduit means which allows fluid communication between the interior of the vertical tube above the swirl imparting means and the space below the horizontal tray.

The invention further relates to a method of contacting gas and liquid.

The method of contacting gas and liquid in a vessel in which there is arranged a horizontal tray provided with a contacting means according to the invention comprises introducing gas and liquid into the vessel, passing liquid and gas upwardly through a vertical tube pertaining to the contacting means in which contacting material is arranged and in which swirl imparting means are arranged above the contacting material, passing liquid separated from gas from the upper parts of the vertical tube to below the horizontal tray, and removing gas from the top of the vessel and liquid from the bottom of the vessel.

In order to obtain overall countercurrent contacting of liquid and gas the vessel comprises two or more axially spaced apart horizontal trays.

BRIEF DESCRIPTION OF THE DRAWINGS

The invention will now be described by way of example in more detail with reference to the drawings, wherein.

DESCRIPTION OF THE PREFERRED EMBODIMENT

Figure 1:
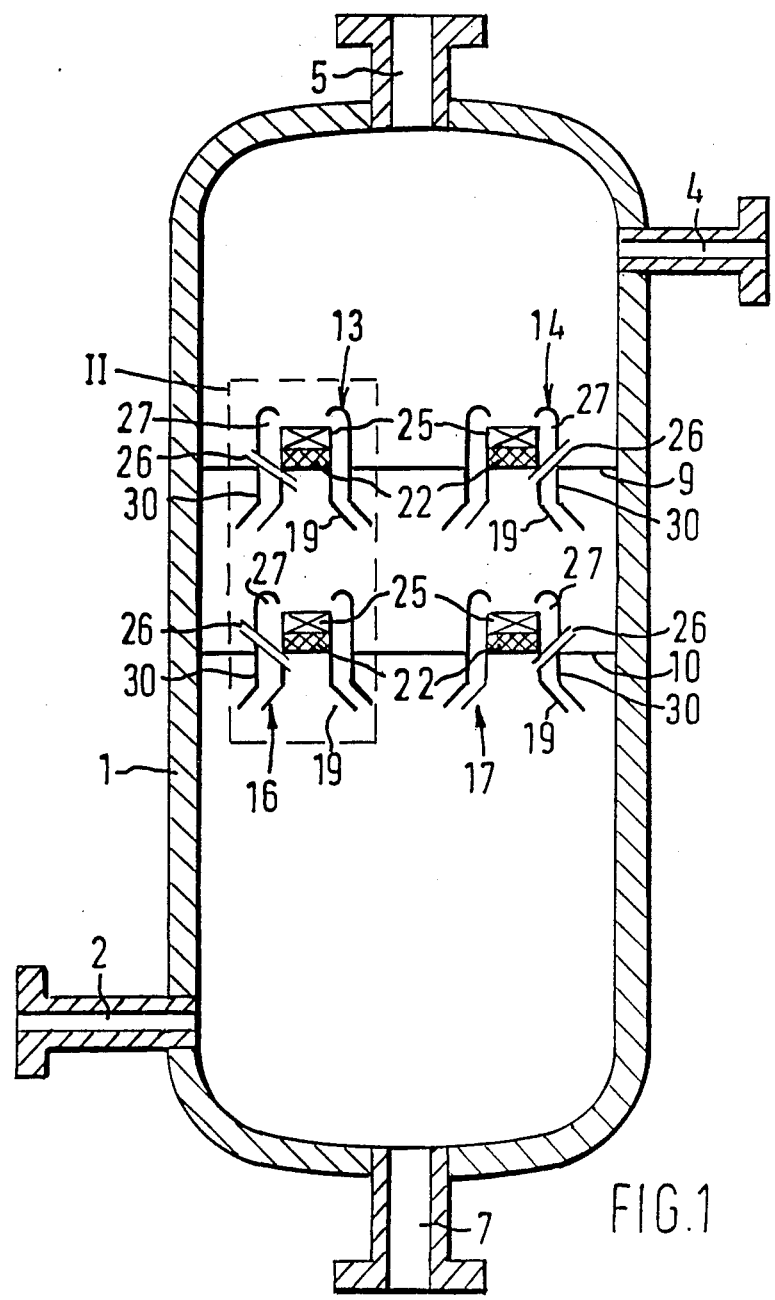
FIG. 1 is a cross sectional view of the apparatus for carrying out the method according to the invention.

The apparatus comprises a normally vertical vessel 1 having fluid inlet means in the form of gas inlet 2 arranged at the bottom part of the vessel 1 and liquid inlet 4 arranged at the top part of the vessel 1, and fluid outlet means in the form of gas outlet 5 arranged at the top part of the vessel 1 and liquid outlet 7 arranged at the bottom part of the vessel 1.

The apparatus further comprises an upper horizontal tray 9 and a lower horizontal tray 10 arranged in the vessel 1, supported by supports (not shown) which are connected to the wall of the vessel 1.

Figure 2:
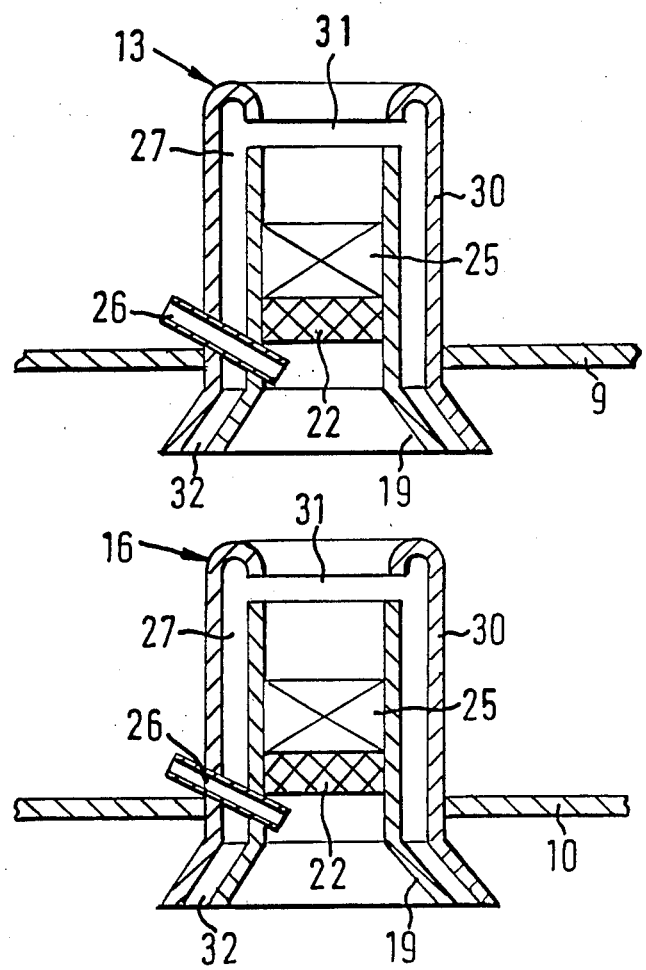
FIG. 2 is a cross sectional view of detail II taken from FIG. 1 and drawn to a larger scale.

The upper horizontal tray 9 is provided with contacting means 13 and 14, and the lower horizontal tray 10 is provided with contacting means 16 and 17. Each contacting means 13, 14, 16 and 17 comprises an open-ended vertical tube 19 in which contacting means 22 are arranged and in which swirl imparting means 25 are arranged above the contacting means 22. The contacting means 13, 14, 16 and 17 further comprise first conduit means in the form of tube 26 allowing fluid communication between the space above the horizontal tray 9 or 10 and the interior of the vertical tube 19 below the contacting material 22, and second conduit means in the form of annular space 27 between the outer side of the wall of the vertical tube 19 and the inner side of the wall of tube 30 arranged externally around the vertical tube 19. Slit 31 (see FIG. 2) provides fluid communication between the upper end of the annular space 27 and the interior of the vertical tube 19 above the swirl imparting means 25, and at the lower end of the annular space 27 there is an outlet opening 32 below the horizontal tray.

During normal operation, gas is continuously introduced into the vessel 1 through gas inlet 2, and it flows upwardly through the vessel 1 via the vertical tubes 19 of the contacting means 16 and 17 pertaining to the lower horizontal tray 10 and via the vertical tubes 19 of the contacting means 13 and 14 pertaining the upper horizontal tray 9. Gas is discharged from the vessel through the gas outlet 5. At the same time liquid is continuously introduced into the vessel 1 through the liquid inlet 4. Liquid is collected on the upper horizontal tray 9 until the liquid level on the upper horizontal tray 9 reaches the inlet openings of the tubes 26 pertaining to the contacting means 13 and 14, then liquid flows through the tubes 26 into the vertical tubes 19 pertaining to the contacting means 13 and 14 below the contacting material 22 arranged in these vertical tubes 19. In each contacting means 13 and 14, the upwardly directed gas flow forces liquid to pass with gas through the contacting material 22 where gas and liquid are intensively contacted in cocurrent flow. Subsequently, the mixture of gas and liquid passes the swirl imparting means 25, arranged above, or downstream to the contacting material 22, where gas and liquid are separated. Gas leaves the upper end of the vertical tube 19 and passes to the gas outlet 5, and liquid flows along the inner side of the wall of the vertical tube 19 above the swirl imparting means 25, through the slit 31 and into the annular space 27 through which liquid flows downwardly.

Liquid leaving the annular spaces 27 through the opening 32 pertaining to the contacting means 13 and 14 is collected on the lower horizontal tray 10 until the liquid level on the lower horizontal tray 10 reaches the inlet openings of the tubes 26 pertaining to the contacting means 16 and 17, then liquid flows through the tubes 26 into the vertical tubes 19 pertaining to the contacting means 16 and 17 below the contacting material 22 arranged in these vertical tubes 19. In each contacting means 16, and 17, the upwardly directed gas flow forces liquid to pass with gas through the contacting material 22, where gas and liquid are intensively mixed in cocurrent flow. Subsequently, the mixture of gas and liquid passes the swirl imparting means 25 arranged above, or downstream to the contacting material 22, where gas and liquid are separated. Gas leaves the upper ends of the vertical tubes 19 pertaining to the contacting means 16 and 17 and flows into the lower ends of the vertical tubes 19 pertaining to the contacting means 13 and 14, and the liquid flows along the inner sides of the walls of the vertical tubes 19 above the swirl imparting means 25 through the slits 31 into the annular spaces 27 through which it flows downardly.

Liquid leaving the annular spaces 27 pertaining to the contacting means 16 and 17 is discharged from the vessel 1 through the liquid outlet 7 arranged in the bottom part of the vessel 1.

The apparatus according to the present invention allows countercurrent flow of gas and liquid through the vessel, whereas gas and liquid flow cocurrently through the contacting material which allows high gas velocities. As a result thereof a short contacting time can be obtained.

The apparatus can be used for removing acid components, such as hydrogen sulphide, carbon dioxide and carbonyl sulphide, from a gas mixture by contacting the gas mixture with a lean absorbent, for example an aqueous solution of an amine. As a result of the short contacting time, the apparatus according to the present invention can suitably be used for selective removal of $H_2S$ from a gaseous mixture containing $H_2S$ and $CO_2$ with a liquid absorbent comprising a tertiary amine or a tertiary alkanolamine and, if required, a physical absorbent.

The apparatus can further be used for distillation, for example distillation of crude oil, wherein a mixture of gaseous and liquid hydrocarbons is introduced into the vessel 1 through inlet 2. The gaseous hydrocarbons will flow upwardly through the vessel 1, a part of these hydrocarbons will condense on the lower horizontal tray 10 and on the upper horizontal tray 9 and the remaining part of the gaseous hydrocarbons is drawn off through the gas outlet 5.

Liquid hydrocarbons present on the lower horizontal tray 10 flow through tubes 26 into the vertical tubes 19 pertaining to the contacting means 16 and 17 below the contacting material 22 arranged therein. Gaseous hydrocarbons and liquid hydrocarbons are contacted in the contacting material 22 and subsequently separated in the swirl imparting means 25.

Gaseous hydrocarbons pass upwardly into the contacting means 13 and pertaining to the upper horizontal tray 9. Liquid separated from gas flows through the annular spaces 27 downwardly to below the lower horizontal tray 10 and is discharged from the vessel 1 through liquid outlet 7.

In the contacting mmeans 13 and 14 pertaining to the upper horizontal tray 9, gaseous hydrocarbons are further contacted with liquid hydrocarbons flowing through tubes 26 from above the upper horizontal tray 9. The separated gaseous hydrocarbons are withdrawn through the gas outlet 5, and the liquid hydrocarbons flow through annular spaces 27 and are collected on the lower horizontal tray 10.

If required, additional liquid hydrocarbons can be supplied through liquid inlet 4 and liquid hydrocarbons may be drawn off from the horizontal trays through outlets (not shown).

In the simplest embodiment of the invention, the apparatus comprises one horizontal tray arranged in the vessel and provided with one contacting means. The horizontal tray may comprise a plurality of contacting means distributed over the tray. To improve the efficiency of the apparatus, the apparatus may further comprise two or more axially spaced apart horizontal trays, for example 5 to 30.

The inlet 2 can, if required, be arranged between the two horizontal trays. Moreover, further fluid inlets can be arranged between two horizontal trays.

Suitable contacting material 22 that can be arranged in a vertical tube of a contacting means will be known to those skilled in the art of packed column design. Examples are random packing such as "Pall"-rings or "Raschig"-rings and saddles of various types, or structured packing comprising regularly arranged arrays or layers of sheet of gauze material, knitted wire or plastic wool or other fibrous material.

Suitable swirl imparting means 25 are, for example, swirl vanes.

What is claimed is:

1. An apparatus for contacting gas and liquid comprising:
   a vessel having a fluid inlet means and a fluid outlet means;
   a horizontal tray arranged in the vessel;
   a contacting means connected to the horizontal tray comprising:
      an open-ended vertical tube;
      contacting material arranged inside the vertical tube; swirl imparting means arranged inside the vertical tube above the contacting material;
      first conduit means allowing fluid communication between the space above the horizontal tray and the interior of the vertical tube below the contacting material; and
      second conduit means allowing fluid communiction between the interior of the vertical tube above the swirl imparting means and the space below the horizontal tray.

2. An apparatus as claimed in claim 1, wherein a plurality of contacting means are distributed over the horizontal tray.

3. An apparatus as claimed in claim 1, wherein the vessel further comprises two or more axially spaced apart horizontal trays.

4. An apparatus as claimed in claim 1, wherein the first conduit means is at least one open-ended tube.

5. An apparatus as claimed in claim 1, wherein the second conduit means is a space between the outer side of a wall of the vertical tube and an inner side of a wall of a tube arranged externally around the vertical tube, the upper end of the space communicating with the interior of the vertical tube above the swirl imparting means and the lower end having an outlet opening below the horizontal tray.

6. A method of contacting gas and liquid in a vessel having a horizontal tray provided with a contacting means comprising the following steps:
   introducing gas and liquid into the vessel;
   passing liquid and gas upwardly through a vertical tube of the contacting means in which a contacting material is arranged below a swirl imparting means.
   passing liquid separated from gas from the upper part of the vertical tube to below a horizontal tray; and
   removing gas from the top of the vessel and liquid from the bottom of the vessel.

7. A method as claimed in claim 6, wherein liquid present on the tray is passed into the vertical tube tube below the contacting material.

8. A gas and liquid contacting apparatus comprising:
a vessel;
at least one substantially horizontal tray attached to the vessel and separating the top and bottom parts thereof;
a liquid inlet at the top part of the vessel;
a gas inlet at the bottom part of the vessel;
a liquid outlet at the bottom part of the vessel;
a gas outlet at the top part of the vessel;
at least one contacting means connected to the horizontal tray, comprising:
an open-ended vertical tube;
a swirl imparting means mounted to the vertical tube;
contacting material arranged beneath the swirl imparting means within the vertical tube;
a first conduit means providing fluid communication between the space above the horizontal tray and the interior of the vertical tube below the contacting material; and
a second conduit means allowing fluid communication from the interior of the vertical tube, through the swirl imparting means and to the space below the horizontal tray.

9. An apparatus in accordance with clam 8 wherein the first conduit means is at least one open-ended tube.

10. An apparatus in acordance with claim 8 wherein the second conduit is a space defined by the outside of the vertical tube and the interior of a tube externally concentric to the vertical tube.

11. A method of contacting gas and liquid in a vessel having a horizontal tray provided with a contacting means, said method comprising the following steps:
introducing the gas into the vessel beneath the horizontal tray;
introducing the liqud into the vessel above the horizontal tray in counterflow to the gas;
passing the liquid collecting on the horizontal tray downwardly within a first conduit means to discharge into an open-ended vertical tube which extends through the horizontal tray;
entraining the liquid discahrged into the vertical tube into cocurrent flow with a high velocity upward flow of the gas proceeding through the vertical tube;
intimately contacting the entrained liquid and the gas in a contacting material within the vertical tube;
separating the contacted, entrained liquid from the contacted gas in a swirl imparting means presented in the vertical tube above the contacting material;
passing the separated gas upward through the vessel;
passing the separated liquid through a second conduit means downwardly through the horizontal tray in counterflow to the gas; and
removing the gas from the top of the vessel and the liquid from the bottom of the vessel.

12. A gas and liquid contacting apparatus comprising;
a vessel;
at least one substantially horizontal tray attached to the vessel and separating the top and bottom parts thereof;
a liquid inlet at the top part of the vessel;
a gas inlet at the bottom part of the vessel;
a liquid outlet at the bottom part of the vessel;
a gas outlet at the top part of the vessel; and
at least one contacting means connected to the horizontal tray, comprising;
an open-ended vertical tube passing through the horizontal tray, said vertical tube having two concentric walls defining an annular space therebetween;
a swirl imparting means mounted to the vertical tube;
contacting material arranged within the vertical tube beneath the swirl imparting means;
an open-ended tube extending downwardly from the space above the horizontal tray to the interior of the vertical tube below the contacting material and at a level below the horizontal tray; and
a conduit means established from a slit opening in the interior wall of the vertical tube above the swirl imparting means, extending downwrdly through the annulus between the walls of the vertical tube and communicating with the space below the horizontal tray.

13. A method of removing select acid components from a gas mixture comprising:
selecting a liquid absorbent which is more reactive with the select acid components in the gas such that during intimate contact, over a selected short contacting period, the select acid will substantially react with the liquid absorbent and the other acids will not substantially react;
introducing the gas into a vessel at a high velocity beneath a horizontal tray;
introducing the liquid absorbent into the vessel above the horizontal tray in counterflow to the gas;
passing the liquid absorbent collecting on the horizontal tray downwardly with in first conduit means to discharge into an open-ended vertical tube which extends through the horizontal tray;
entraining the liquid absorbent discharged into the vertical tube into cocurrent flow with a high velocity upward flow of the gas proceeding through the vertical tube at a rate to effect the desired short contacting period;
intimately contacting the entrained liquid absorbent and the gas in a contacting material within the vertical tubes;
substantially reacting the select acid components in the gas with the liquid absorbent during the short contact period;
separating the contacted liquid absorbent from the contacted gas, in a swirl imparting means presented in the vertical tube above the contacting material before other acid components substantially react with the liquid absorbent;
passing the separated gas upward through the vessel;
passing the separated liquid through a second conduit means downwadly through the horizontal tray in counterflow to the gas; and
removing the gas from the top of the vessel and the liquid absorbent from the bottom of the vessel.

14. The method removing select acid components from a gas mixture in accordance with claim 13 wherein the gas mixture comprises $H_2S$ and $CO_2$ and selecting a liquid absorbent comprises preparing an aqueous solution of tertiary amine.

15. The method removing select acid components from a gas mixture in accordance with claim 13 wherein the gas mixture comprises $H_2S$ and $CO_2$ and selecting a liquid absorbent comprises preparing an aqueous solution of tertiary alkanolamine.

* * * * *